Nov. 22, 1938.                G. B. RUBY                2,137,702
                        EYE TESTING APPARATUS
                       Filed Oct. 10, 1936            2 Sheets-Sheet 1
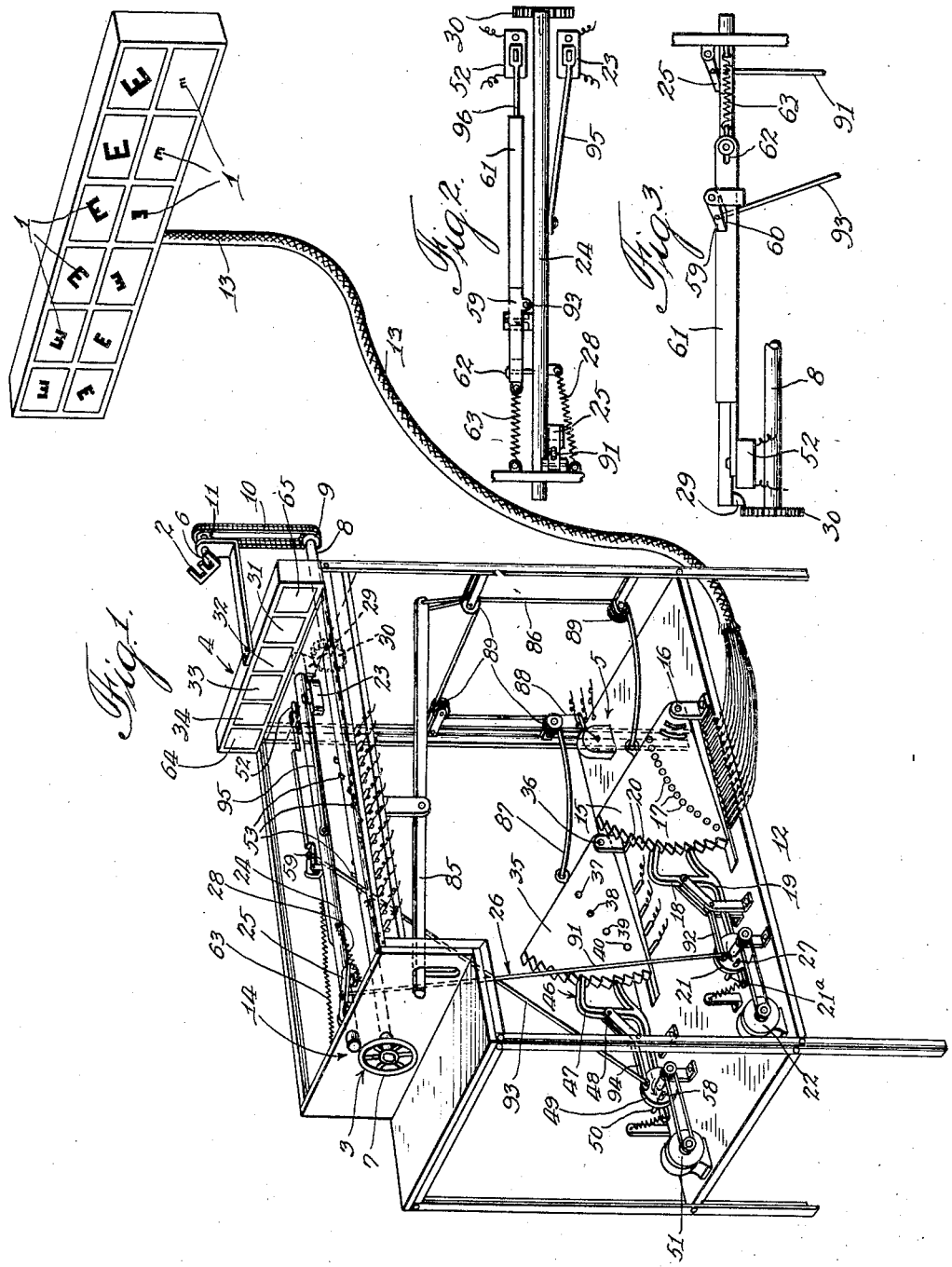
Inventor
George B. Ruby.
By Ames, Thiess, Olson & Mecklenburger
Attys.

Nov. 22, 1938.   G. B. RUBY   2,137,702
EYE TESTING APPARATUS
Filed Oct. 10, 1936   2 Sheets-Sheet 2

Inventor:
George B. Ruby.
By Amts, Thiess, Olson & Mecklenburger
Attys.

Patented Nov. 22, 1938

2,137,702

UNITED STATES PATENT OFFICE 2,137,702

EYE TESTING APPARATUS

George B. Ruby, Aurora, Ill.

Application October 10, 1936, Serial No. 104,983

3 Claims. (Cl. 88—20)

My invention relates to vision and reaction testing apparatus.

The basis for determination of normal ability to discern details has been standardized for many years by means of many graded series of test objects but the information of the ability to discern detail of these graded series of test objects has been orally given by the testee to the testor and the testor finally reported to the testee at the end of the test the quality of discerning ability of the testee, with the testor basing his opinion on statements made by the testee. Present tests for the ability of discernment of details, therefore, require the presence of testee and testor, and the time requirement for such discernment and reaction is completely neglected.

One of the objects of my invention is to provide means whereby an individual may quickly and accurately discover by himself and for himself his ability, both in speed and accuracy, to discern and react, and compare himself thereby to the normal ability of other persons.

A further object of my invention is to make a record of tests which are made so as to give information for guidance, in their several pursuits, of educators, legislators, practitioners and students in the arts and sciences, and others who have interest in public vision.

A further object of my invention is to provide a rapid dependable means of enabling any individual to investigate his vision ability and thereby know when he requires the services of a skilled examiner for the correction of his unsafe vision.

A further object of my invention is to enable the testee to record the vision of each of his eyes separately as well as of both eyes together and thereby be able to discover the unsafe vision of either eye singly and be prompted to have his unsafe vision of the single eye corrected or attended by a skilled examiner.

In the drawings, in which an embodiment of my invention is shown,

Figure 1 is a perspective view of the apparatus;

Fig. 2 is a plan view of a switch-controlling push bar and associated parts;

Fig. 3 is a side elevational view of the parts shown in Fig. 2; and

Figure 4:
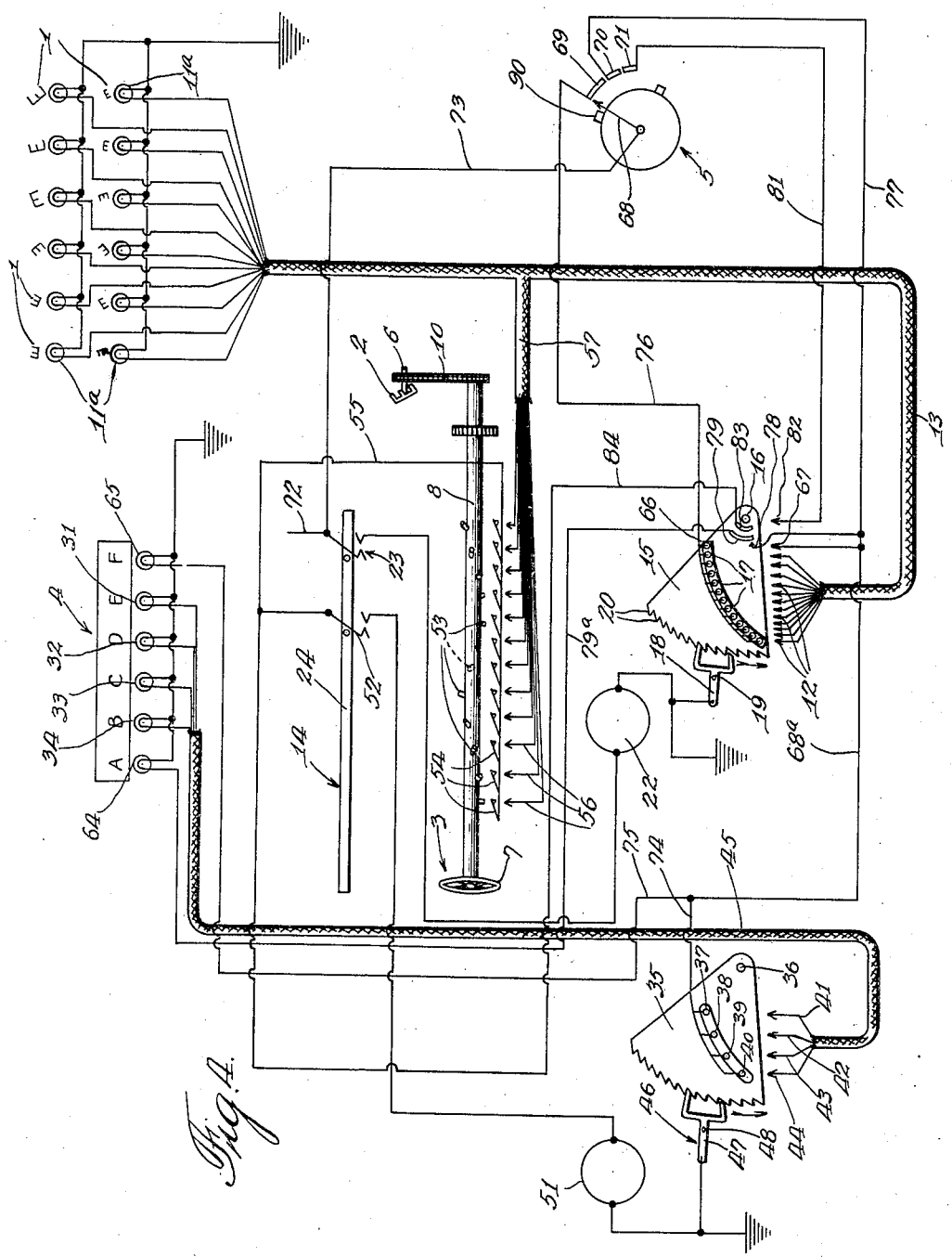
Fig. 4 is a diagrammatic view showing the wiring.

The construction shown comprises a series of observable objects 1 of similar shape but differing in size and angular position located a substantial distance from the user of the apparatus who is the testee, means for successively displaying said objects to the testee, a comparison object 2 similar in shape to the observed object mounted for angular adjustment by the testee whereby it may be adjusted to correspond in angular position to the position of the displayed object, means 3 operable by the testee for angularly adjusting the comparison object, means 4 operable at the end of the test for showing whether or not the testee has been successful in making the required angular adjustments of the comparison object, and time-controlled means 5 for determining the duration of the testing period. The successively displayed observable objects shown comprise a series of printed letters of the Snellen specification, twelve being shown and all being of the same design but differing in size and angular position. The comparison object may also be a letter of the Snellen specification mounted on a rotatable shaft 6 and adjustable by means of a hand wheel 7. The transmission from the hand wheel to a shaft on which the comparison letter 2 is mounted comprises a rotatable shaft 8 on which the hand wheel 7 is mounted, a sprocket 9 mounted on this shaft, a sprocket chain 10 running over this sprocket and a sprocket 11 mounted on the shaft 6 on which the comparison object 2 is mounted.

The means for successively displaying the observable letters comprises a plurality of electric lights 11a, one for each of the letters 1 which are to be successively displayed, one lamp being located in a compartment behind each of the letters, a plurality of successively energized contacts 12, one for each of the displayed letters, a cable 13, the conductors of which connect the contacts 12, respectively, with the lamps for the displayed objects 1, and means 14 controlled by the operator and operated by him after he has made each adjustment of the comparison object for cutting out the lamp which has just been lit and causing the lighting of a succeeding display letter 1.

The means for successively energizing the contacts 12 leading to the lamps for the display letters comprises a sector 15 pivoted at 16 and carrying a series of contacts 17 which are successively moved into contact with the light-controlling contacts 12 and means controlled by the operator for giving a step-by-step movement to this sector, a one-step movement being given after each adjustment of the comparison object 2. The means for controlling this step-by-step movement of the contact-carrying sector 15 comprises an escapement lever 18 pivotally mounted at 19 and co-operating with the teeth 20 on the edge of the sector, an actuating disc 21 provided with a pin 21a for controlling this escapement lever 18, an electric motor 22 for driving the actuating disc 21, a switch 23 for controlling the starting and stopping of the motor 22, a manually operable push bar 24 for moving the switch 23 to motor-starting position, a latch 25 for holding the push 24 in position to keep the motor running and a latch-releasing mechanism 26 controlled by a pin 27 on the actuating disc 21 for releasing the latch 25 to allow the spring 28 to return the push bar 24 to open the motor switch 23 and stop the motor 22.

In order to prevent the testee from making any adjustment of the hand wheel 7 which controls the position of the comparison object 2 after he has pressed the push bar 24 in to put the apparatus in readiness for the next step in the testing operation, the push bar 24 is provided with a finger 29 which will engage between the teeth of a star wheel 30 mounted on the adjusting shaft 8 when the push bar 24 is pressed inwardly by the testee, thus preventing any possibility of further adjustment of the hand wheel 7 until the push bar is released from the latch 25 and returned by the spring 28.

The means for showing the degree of success obtained by the testee in making the required angular adjustments of the comparison object 2 comprise a plurality of legend display devices 31, 32, 33 and 34, four being shown, one of which legends 31 may indicate "safe"; another, 32, "moderately unsafe"; another, 33, "unsafe", and another, 34, "very unsafe," a contact-carrying sector 35 pivotally mounted at 36 and having four contact points 37, 38, 39 and 40 mounted thereon, one for each of the display legends, four fixed contacts 41, 42, 43 and 44 co-operating with the four contacts 37, 38, 39 and 40 on the movable sector member, respectively, a cable 45 having four conductors leading from the four fixed contact points 41, 42, 43 and 44 to the four display lights for the legend-carrying devices 31, 32, 33 and 34, and means 46 for controlling the advance of the contact-carrying sector in accordance with the degree of success obtained by the testee in making the indicated adjustment of the comparison object.

The means for controlling the advancing movement of the sector comprises an escapement lever 47 pivotally mounted at 48, a rotatable control disc 49 provided with a pin 50 for controlling this escapement lever 47, a motor 51 for causing the rotation of the control disc 49, a switch 52 for controlling the operation of the motor 51, and a helically arranged series of circuit-controlling pins 53 mounted on the shaft 8 which controls the position of the comparison object 2. The number of these circuit-controlling pins 53 corresponds to the number of fixed contacts 12 which are successively energized by the movement of the sector 15 which controls the lamps for the display objects 1. These circuit-controlling pins co-operate, respectively, with a series of movable contact members 54 connected with a line 55 leading to the switch 52 for the motor 51 of the indicator-controlling sector which controls the legend display devices 31, 32, 33 and 34. These movable contacts 54 co-operate, respectively, with fixed contacts 56 which, in turn, are connected, respectively, with the fixed contacts 12 of the total sector by means of a cable 57. The circuit-controlling pins 53 on the shaft are so set that if the testee makes adjustment of the comparison object 2 with respect to the displayed object with sufficient accuracy, an electrical circuit will be established from whichever one of the total sector contacts 12 is energized through one of the conductors of the cable 57 to one of the fixed contacts 56 co-operating with that one of the movable contacts 54 which is depressed by a pin 53 on the shaft 8 and thence through the conductor 55 to the movable member of the switch 52 for the motor 51. Thus, if the testee has made the adjustment of the comparison object with the required degree of accuracy, a circuit will be completed up to the switch 52 for the motor 51. After the testee has made his adjustment of the comparison object 2, with respect to the particular object 1 then displayed, he pushes in the push bar 24, which closes the switch for the total sector motor 22. This pushing in of the push bar also closes the switch for the indicator sector motor 51 so that if the correct adjustment of the comparison object 2 has been made, the indicator sector motor will be put in operation to cause a one-step advance of the indicator sector. However, if the testee has not made the adjustment of the comparison object 2 with the required degree of accuracy, this failure will result in an open circuit as the movable contact 54 corresponding to that one of the contacts 12 which is at that time energized will not be depressed, or at least not depressed sufficiently to close the circuit. Thus, failure to make the required adjustment will result in a failure in the step movement of the indicator sector 35. The indicator sector motor 51 is provided with means whereby it breaks its own circuit after it has caused the one-step movement of the indicator sector similar to the motor-stopping device provided for the total sector motor 22. This motor-stopping mechanism comprises a pin 58 on the control disc 49 which releases a latch member 59, mounted on the push bar 24, which latch member is engageable with a notch 60 on the slide 61 which controls the motor switch 52. It is necessary that the indicator-sector motor 51 should complete its movement before the total sector motor 22 has completed its movement, as otherwise the step movement of the total sector would cut off the supply of current to that contact 56 which should be engaged by a contact 54, thus preventing the possibility of the desired action of the indicator-record motor 51. For this purpose, the apparatus is so designed that the control disc 49 will complete a single revolution before the total-sector-controlling disc 21 completes its single revolution. In order that the switch 52 for the indicator-sector motor may open as soon as the latch 59 has been moved to releasing position, the slide 61 which controls the motor switch 52 is mounted for lost motion on the push bar 24 by means of a pin-and-slot connection 62, so that it can be returned to open the switch 52 as soon as the latch 59 is released, this return movement being effected by means of a coil tension spring 63. The return movement of the push bar 24 is effected as soon as the retaining latch 25 is released by means of a coil tension spring 28.

With this construction, it will be seen that the total amount of movement of the indicator sector 35 will be proportional to the degree of success attained by the testee in making the required successive adjustments of the comparison object. Thus, if the testee has been successful in making all twelve adjustments with the required degree of accuracy, the record sector will have traveled its full movement. If, however, the testee has failed to make the required adjustment with respect to three of the displayed objects, the record sector will have moved only three-fourths of its possible movement, since there are twelve total possible movements in a complete test.

The circuits for the legend-illuminating lamps may be so designed that if there are less than three failures in the complete test, the "safe" legend 31 will be displayed. If there are more than three but less than seven failures the "moderately unsafe" legend 32 will be displayed. If there are more than six but less than ten failures, the "unsafe" legend 33 will be displayed. If there are more than nine failures, the "very unsafe" legend 34 will be displayed. If will be understood, of course, that other divisions of "degree of safety" zones might be arranged and that, if desired, there could be a special legend for each step on the indicator sector, a suitable number of additional contacts 41, 42, 43 and 44 being provided for this purpose.

In order to put a time limit on the testing period and thus provide a check for slow reaction, etc., a time-controlled device 5 is provided to limit the testing period and an indicating device 64 is provided which will inform the testee if he has been too slow in his reactions. An indicator device 65 is also provided for showing when the test has been completed. The indicator device 65, for showing that the test has been completed, comprises a lamp which will illuminate a suitable legend, this lamp being lit by a contact 66 on the total sector which on the last step movement of the total sector 15 engages a fixed contact 67 connected by a conductor 68 to the "test complete" indicator lamp 65. The engagement of contacts 66 and 67 also energizes the contacts 37, 38, 39, and 40 on the indicator sector 35, causing one of the "test report" lamps 31, 32, 33 or 34 to be lighted at the end of the test operations. The time-controlled device 5 comprises a time-controlled contact arm 68 which cooperates with three contact pieces 69, 70 and 71 in its time-controlled movement. The construction is such that the movable contact 68 remains in engagement with the contact 69 during the predetermined testing period, the length of which period will be such that any testee who reacts with normal or safe promptness will complete the series of tests within the time provided. The movable contact 68 is connected with the line 72 by means of a conductor 73. So long as the movable contact 68 is in engagement with the first contact 69, the contacts 17 and 66 on the total sector 15 will be energized. Consequently, one of the contacts 56 will be energized to enable the indicator sector motor 51 to be actuated if the correct adjustment of the comparison object 2 is made. However, when the movable contact 68 moves out of engagement with this first contact 69, all of the contacts 17 and 56 are dead, so that no energization of the conductor 68a and its branches 74 and 75, which supply current for the indicator lamps 31, 32, 33, 34 and 65, can take place through the conductor 76 connected with the contact 69. In order to supply current to these lamps 31, 32, 33, 34 and 65 and also to light the "slow" lamp 64 in the case where the testee has been slow in his reactions, the "slow" contact at 70 is provided, connected by conductor 77, conductor 68a and also to fixed contact 78, which cooperates with an arcuate contact 79 on the total sector 15, this arcuate contact 79 being connected with the "slow" lamp 64 through conductor 79a. The arcuate contact 79 is so designed that it will be in engagement with the fixed contact 78 until the final step movement of the total sector 15, at which time the connection will be broken. With this construction, it will be seen that if the movable contact 68 moves out of engagement with the "test period" contact 69 into engagement with the "slow" contact 70 before the testee has caused the total sector 15 to complete its full movement, the "slow" lamp 64 will be lit, indicating slow reaction on the part of the testee. The "slow" contact 70 is also connected with the contacts 37, 38, 39 and 40 on the indicator sector, so that the circuit will be completed to one of the accuracy indicator lamps 31, 32, 33 or 34. If, on the other hand, the testee completes the test before the movable contact 68 moves out of engagement with the test period contact 69, a circuit will be established from the test period contact 69 through the conductor 76 to the contact 66 on the total sector 15, which will engage the fixed contact 67 on the final step movement of the total sector to energize contacts 37, 38, 39 and 40 and thereby cause the "test complete" lamp 65 and also one of the accuracy indicator lamps 31, 32, 33 or 34 to be lit.

The third contact 71 engageable by the movable contact 68 is provided because of the fact that the sector-controlling motors 22 and 51 require a substantial period of time to complete a single revolution of the discs 21 and 49, respectively. In operation, it might happen that the movable contact 68 might move from the "test period" contact 69 to the "slow" contact 70 during the time cycle of the revolution of the disc 21. If this should occur, the motor 22 controlling the total sector 15 would complete its cycle and stop after it had completed a single revolution of the disc 21 so as to be ready for another actuation when the next test starts, but the indicator sector motor 51, since it depends for its energy on the contacts 17, would be cut off from its supply when the movable contact 68 de-energizes the test period contact 69. Unless provisions were made to take care of the situation, the disc 49 might stop at some intermediate part of its revolution. In order to take care of this situation, the third contact 71 is provided, which, when engaged by the movable contact 68, will supply current to the indicator sector motor 51, the circuit being from the emergency contact 71 through the conductor 81 to the fixed contact 82, thence through the arcuate contact 83 on the total sector, conductor 84 and switch 52 to the motor 51. This enables the indicator sector motor 51 to complete its cycle.

In order to reset the apparatus after a test has been completed, suitable mechanism is provided for restoring the sectors 15 and 35 and the time-controlled apparatus 5 to original starting position. The construction shown for this purpose comprises a starting lever 85 and cable connections 86, 87 and 88 running over suitable pulleys 89 and connected with the sectors 15 and 35 and the movable contact 68 in such a manner that when this lever 85 is depressed, the sectors 15 and 35 will be raised to their uppermost position and the movable contact 68 will be brought up against the starting position stop 90 (Fig. 4). A slip friction connection (not shown) is provided for driving the movable contact 68 so that this contact can be turned backward forcibly against the action of the friction drive in the resetting operation.

Referring further to the details of the release mechanism for the latches 25 and 59, the release for the latch 25 comprises a link 91 pivotally connected with the latch 25 and also pivotally connected with the lever 92 which is actuated by the pin 27, and the release mechanism for the latch 59 comprises a link 93 pivotally connected with the latch 59 and also pivotally connected with the lever 94 which is actuated by the pin 58.

Referring further to the details of the switch-actuating mechanism, the switch 23 is operated by means of a link 95 pivotally connected with the switch lever and also pivotally connected with the push bar 24, and the switch 52 is operated by means of a link 96 connecting the slide 61 with the switch lever.

In using the apparatus, the testee first depresses the starting lever 85 which will place the apparatus in position for beginning the test by raising the sectors 15 and 35 and placing the contact 68 in initial position. This will cause the illumination of the No. 1 display object 1. Testee will then adjust the hand wheel 7 in an attempt to bring comparison object 2 into a position corresponding to the position of the display object which is then being illuminated. When the testee has completed his adjustment of the comparison object, he presses the push bar 24 inwardly, thus putting the total sector motor 22 into operation and, if he has been successful in making the proper adjustment of the comparison object 2, also putting the indicator sector motor 51 into operation. The operation of the total sector motor will cause a single revolution of the control disc 21, causing a one-step downward movement of the total sector 15 to cut off the illumination for the No. 1 display object 1 and illuminate the No. 2 display object or letter 1. This will also de-energize the No. 1 contact 56 and energize the No. 2 contact 56. In the meantime, if the correct adjustment of the comparison object has been made, the motor 51 will have been energized, causing a single revolution of the control disc 49, which will complete its revolution before the control disc 21 causes de-energization of the No. 1 contact 56. The revolution of the control disc 49 will cause a one-step downward movement of the indicator sector 35 and will thereafter release the latch 59 causing the switch 52 for the motor 51 to open. Thereafter, the control disc 21 will release the latch 25, enabling the spring 28 to return the push bar 24 to open the switch 23 for the total sector motor 22. The parts are now in position for the testee to make his adjustment for the No. 2 display object. The testee then adjusts the hand wheel 7 to bring the comparison object 2 into position to correspond with the No. 2 display object, which is now illuminated. When the testee has made this adjustment, he again pushes in the push bar 24, causing a cycle of operations to be performed similar to that described in connection with display object No. 1. The testee repeats this operation for all of the twelve display objects.

In this test, it will be noted that each operation of the push bar 24 causes a one-step downward movement of the sector 15 and also, if the comparison object has been properly adjusted, a one-step downward movement of the indicator sector 35. However, if the testee has failed to make the adjustment of the comparison object 2 with the required degree of accuracy, the proper contact will not be made with the energized one of the contacts 56 and, as a consequence, the indicator sector motor 51 will not be energized and the indicator sector 35 will not be moved. If the operator makes all twelve of the adjustments while the movable contact 68 is in engagement with the contact 69, the contact 66 will engage the contact 67 at the end of the test, energizing the contacts 37, 38, 39 and 40 and also causing the "test finished" lamp 65 to be lit. The energization of the contacts 37, 38, 39 and 40 will energize one of the fixed contacts 41, 42, 43 or 44 and will cause the corresponding accuracy-indicating lamp 31, 32, 33 or 34 to be lit.

As previously explained, the more successful the testee has been in making accurate adjustments, the farther down the indicator sector 35 will be moved. If it has been moved far enough down so that the contact 37 engages the contact 41, the "safe" vision lamp 31 will be lit. If sector 35 is not moved down far enough to energize the contact 41 but far enough to energize the contact 42, the "moderately unsafe" lamp 32 will be lit. If the sector 35 has not moved down far enough to energize contact 42 but far enough to energize contact 43, the "unsafe" vision lamp 33 will be lit. If the sector 35 is moved down only far enough to energize the contact 44, the "dangerously unsafe" lamp 34 will be lit.

If the testee has been so slow in his reactions that the contact 68 moves out of engagement with the contact 69 and into engagement with the contact 70, the "slow" lamp 64 will be lit through a circuit including the conductor 77, contacts 78 and 79. At the same time, the "test finished" lamp 65 will be lit and one of the lamps 31, 32, 33 or 34 will be lit, depending on the position of the indicator sector 35.

It will be seen that by means of the above apparatus, an individual may quickly and accurately discover without any outside help his ability both in speed and accuracy to discern and react and compare himself thereby to the normal ability of other persons.

Further modifications will be apparent to those skilled in the art and it is desired, therefore, that the invention be limited only by the prior art and the scope of the appended claims.

Having thus described my invention, what I claim and desire to secure by Letters Patent is:

1. Apparatus for testing vision and reaction comprising a series of observable objects each indicating to the observer a specific adjustment to be made by the observer, a comparison object mounted for adjustment by the observer to any of the adjustments indicated by the observable object, a series of means associated respectively with the said series of observable objects, means connected with the comparison object operable by the observer for adjusting the comparison object and coacting with the series of means one at a time to make the corresponding one of the series of means effective to indicate whether or not the observer has made the adjustment of the comparison object indicated by the observed object, and means operated by the observer after each adjustment of the comparison object for displaying a succeeding observable object and rendering the corresponding one of said series of means effective for cooperation with the said means which coact with the series of means.

2. Apparatus for testing vision and reaction comprising a series of observable objects each indicating to the observer a specific adjustment to be made by the observer, a comparison object mounted for adjustment by the observer to any of the adjustments indicated by the observable object, a series of means associated respectively with the said series of observable objects, means connected with the comparison object operable by the observer for adjusting the comparison object and coacting with the series of means one at a time to make the corresponding one of the series of means effective to indicate whether or not the observer has made the adjustment of the comparison object indicated by the observed object, and means operated by the observer after each adjustment of the comparison object for displaying a succeeding observable object, rendering the corresponding one of said series of means effective for cooperation with the said means which coact with the series of means, and preventing further adjustment of said comparison object prior to the rendering effective of the corresponding one of said series of means.

3. Apparatus for testing vision and reaction comprising a series of observable objects each indicating to the observer a specific adjustment to be made by the observer, a comparison object mounted for adjustment by the observer to any of the adjustments indicated by the observable object, a series of circuit closers associated respectively with the said series of observable objects, means connected with the comparison object operable by the observer for adjusting the comparison object and coacting with the series of circuit closers one at a time to make the corresponding one of the series of circuit closers effective to indicate whether or not the observer has made the adjustment of the comparison object indicated by the observed object, and means operated by the observer after each adjustment of the comparison object for displaying a succeeding observable object and rendering the corresponding one of said series of circuit closers effective for cooperation with the said means which coact with the series of circuit closers.

GEORGE B. RUBY.